W. O. SNELLING.
PREPARATION OF COMPOUNDS BY THE AID OF LIGHT.
APPLICATION FILED JULY 1, 1913.
1,285,823.
Patented Nov. 26, 1918.
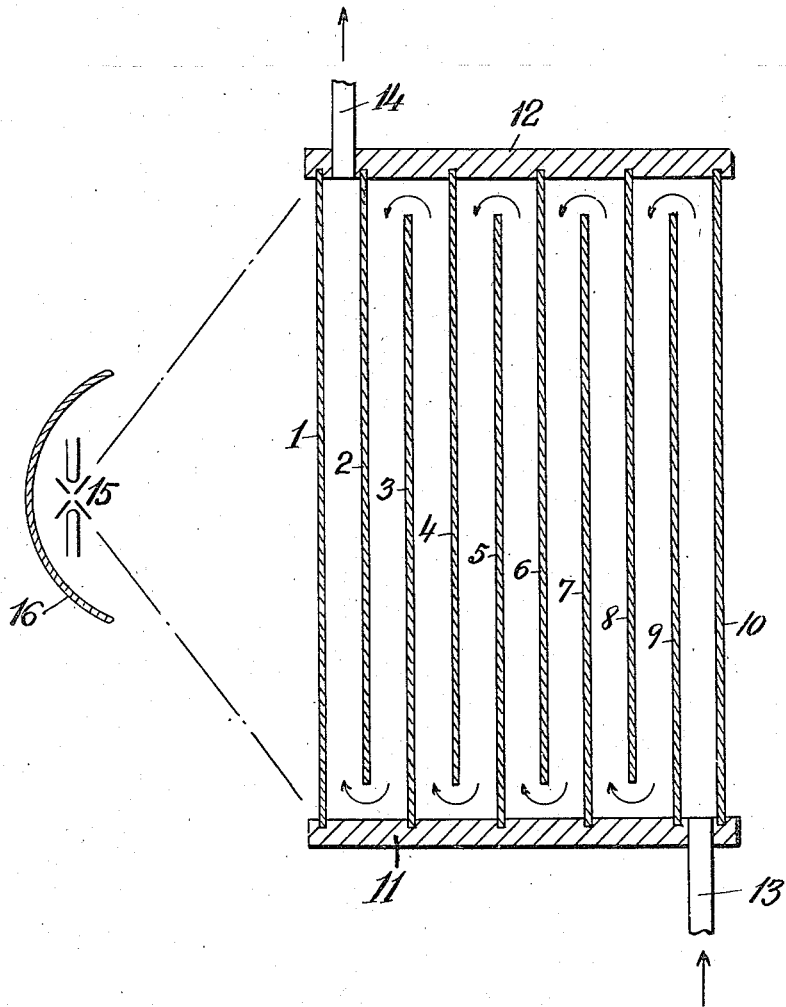
Witnesses:
S. M. Baeder
Josephine Neusler
Walter O. Snelling, Inventor
By his Attorney
Drew Smith

UNITED STATES PATENT OFFICE.

WALTER O. SNELLING, OF PITTSBURGH, PENNSYLVANIA.

PREPARATION OF COMPOUNDS BY THE AID OF LIGHT.

1,285,823.  Specification of Letters Patent.  Patented Nov. 26, 1918.

Application filed July 1, 1913. Serial No. 776,834.

*To all whom it may concern:*

Be it known that I, WALTER O. SNELLING, a citizen of the United States, and a resident of Pittsburgh, county of Allegheny, State of Pennsylvania, have invented certain new and useful Improvements in the Preparation of Compounds by the Aid of Light, of which the following is a description.

My invention relates to improved methods of preparing chemical compositions by reactions which are accelerated by light. Apparatus for practising such methods is described and claimed in my copending application, Serial No. 848,355, filed July 1, 1914, which is a continuation of the present application. By my invention many reactions, which are facilitated or induced by the action of light, may be utilized in the formation of highly desirable products. While the effect of light on such reactions has been known in many cases, difficulties have been experienced in attempting to make use of the phenomenon. Thus in some cases the reaction in the presence of direct sunlight or light from other sources proceeds with violence, or is difficultly controlled, resulting in the formation of non-uniform products, or products in which the reaction has been carried beyond the desired point. It has been proposed to solve these difficulties in various ways, such as by subjecting the mixture in which a reaction is desired to the action of ultra-violet rays or other specially selected light, or by diluting the gaseous mixture of reagents with an inert gas before subjecting it to the action of light. Such methods are successful to only a limited degree or are adapted to special cases only. By my invention a continuous process is provided which may be practised on a commercial scale in a simple and effective manner, and with a large range of applicability. The principle which I utilize is the gradual application of light to reacting bodies, in cases in which light promotes or causes reaction, but does so with harmful or explosive violence if applied fully and directly and without modification. By my invention the amount or effectiveness of the light upon the reagents during the reaction is automatically regulated and progressively increased from the minimum amount, which is such an amount as may safely be applied to the reagents at the beginning of the reaction, to the maximum amount, which may be the direct and uninterrupted sunlight, or other form of light, at the end of the reaction. In other words, the brightness or effectiveness of the light in promoting reaction is automatically controlled so as to be at no time stronger than is safe at that time in view of the chemical activity of the reagents at that time.

It seems probable that different molecules of any one of various reagents, such for example as chlorin, show different degrees of activity, some of the molecules in a volume of gas being in a condition readily to combine with hydrocarbons, while other molecules at any given moment are not so ready to combine. In accordance with this view, it may be said that by my invention molecules in the most active condition, in the reacting bodies, are caused to react by the minimum amount of light, and reaction of the less reactive molecules is caused to take place under the action of greater amounts of light.

Accordingly, the objects of my invention are to provide improved methods for preparing various bodies, such as halogen compounds of hydrocarbons, and, generally speaking, whatever bodies may be prepared by the observance of the principles above pointed out, by the gradual and progressive application of light to the mass or mixture of substances, reaction in which is induced or accelerated by light; and to provide apparatus suitable for practising such methods.

Among the various reactions to which my invention may be applied with improved results, the reaction of halogens with hydrocarbons may be particularly noted. It is well known that such reactions are facilitated by the action of light, and proceed with rapidity when the reacting mixture is exposed to sunlight. As indicated above, former methods for utilizing this reaction have shown that the presence of direct sunlight causes such reactions to proceed with such violence as to lead to explosions, and to result in the over-halogenation of the hydrocarbons employed. By my method these difficulties are avoided. Among the substances which I have halogenized successfully by my improved methods may be mentioned, as examples, natural gas, ethane, propane, acetylene, etc., all of which may be caused readily to combine with halogens, such as chlorin or bromin, by my method, to form desired compounds. Propane, for example, affords propyl chlorid as the first product of chlorination under the described conditions. Propyl chlorid is a raw material from which other useful products containing the propyl group may be readily prepared. In fact, all gaseous, liquid and vaporizable hydrocarbons, both saturated and unsaturated, are suitable for treatment in accordance with my process, except a few unsaturated bodies which form explosive mixtures even in the dark and which are therefore unsuited for direct combination.

In order that a clearer understanding of my invention may be had, attention is hereby directed to the accompanying drawing, forming part of this specification, and illustrating one form of apparatus which may be used in carrying out my improved process.

In the drawing, the figure represents in vertical section a cell for carrying out the process.

In the preferred form of my invention I make use of a succession of jackets of some transparent material, and introduce the mixture of halogen and hydrocarbon, or other reagents which may be treated in the manner described, within the innermost jacket, that is, in the jacket farthest removed from the light, where it is protected from the action of light by the outer jackets, through which the light must pass before it can reach the mixture in the inner jacket. From this point the mixed substances are caused to traverse each jacket in turn, from the inner to the outermost, the halogenation or other reaction proceeding in increasing degree as the reacting mixture is exposed to increasing amounts of light.

In practical use I may employ the apparatus shown in the drawing, in which a series of plates of glass 1, 2, 3, 4, 5, 6, 7, 8, 9, 10, are set in parallel position, alternate plates, 3, 5, 7, and 9, being secured in any suitable manner at one end, as the bottom, to frame member 11 of the cell, these plates terminating at their other or top ends some distance from frame member 12. Alternate plates 2, 4, 6, and 8 are secured at the opposite end to frame member 12, and do not quite extend to frame member 11. Plates 1 and 10, constituting the front and back of the cell, extend from one frame member to the other. Reacting gases or ingredients, as for example chlorin and a hydrocarbon such as acetylene or as propane, are admitted into the apparatus to the rear of plate 9, by inlet 13, and the chlorinated hydrocarbon, or other completed product, is removed through outlet 14, immediately to the rear of front plate 1. The particular point however at which the condensed chlorinated product is removed will of course depend upon its condensability, that is the temperature at which it becomes liquid, and the temperature maintained in the apparatus. The apparatus is of course provided with closed sides, (not shown), so that the path of the reacting ingredients from the inlet to the outlet 14 is, as shown by the arrows, around the various plates in order, from the back to the front. I usually employ a mirror as the last plate, 10, in the apparatus, which seems to produce beneficial results, but this is not necessary. The source of light in the drawing is represented at 15, in front of the first plate 1. This light may be sunlight, or other source of light. If an artificial light is used a reflector 16, back of the same, would be used, as shown.

It is evident that the form of apparatus and process just described does not depend upon the nature of the transparent material used, since I may make use of plates of quartz, celluloid, mica, or other material through which light may be transmitted. Furthermore, my invention is not limited to the use of parallel plane plates, since cells of other forms may be used.

Thus, for example, a series of tubular members, arranged one behind the other, have been used successfully by me, the reacting mixture being introduced into the rear member, farthest from the light, and caused to travel in order through each tube of the set, finally passing through the front or outermost tube, exposed to the direct presence of the light. Or a continuous spiral member may be used, in which the light is caused to pass through the outer turns of the spiral to reach the inner turns, the mixture being introduced at the center, and the light being supplied, if desired, from opposite sides.

Where plates of glass are used, I find that by setting them close together they act to perform the well-known function of a wire gauze to reduce the possibility of explosion, in addition to their effect of progressively decreasing the light supply to the rear elements of the cell. This effect is not however, essential to my process, which may be practised with the transparent elements set too far apart to act in this manner.

In many cases the reacting substances themselves in the front part of the apparatus have considerable effect in shutting off the light from the rear part of the cell. Thus in the chlorination of a hydrocarbon, the chlorin is somewhat yellow in color, and both the gas and the plates of glass take up the chemical activity of the light. The necessary and best amount of light to be transmitted may be determined for any suitable desired reaction, and the conditions altered accordingly, by the use of a greater or less number of plates of transparent material, by altering the spacing thereof, or the light-conductivity thereof. In the case of a chlorination process with transparent glass plates, I find that but little light gets through six plates with intervening chlorin. A greater number of plates may be used however, where the conditions make it desirable. The plates in the apparatus shown may be readily adjusted or clamped in position and readily removed. It will be noted that in the described apparatus the light and the reacting mixture travel against each other. This insures that at the point where the light has its maximum actinic power the concentration of the reacting bodies is at its minimum; and vice versa. This greatly contributes to a uniform, regular and nonviolent action; to a smooth and desirable type of halogenation. The presence of chlorin in increasing proportions in the path of the actinic light insures a progressive cutting down of the actinic rays which are capable of affecting chlorin. In other words, where the tendency to reaction is the greatest the catalytic effect of the light is the least, and vice versa.

If desired, some of the plates or other media used may be colored to cut off all space beyond the same from the influence of a certain color of light, or to modify or reduce the light transmitted through some or all of the plates. Thus if it be found desirable to perform a part or all of a given reaction under the action of rays from any part of the spectrum, the apparatus may be readily adapted to the purpose. Similarly various sources of light, which should be approximately constant for best results, may be used, sunlight, however, being best for most purposes.

The process may be carried out with a mixture of reagents in any form sufficiently light-conductive, not to prevent the transmission of light through the same to the rear elements of the cell, and which reagents are acted upon by light in the desired manner. If liquids are used, the same may be caused in any suitable manner to flow through the apparatus. If it is desired to use a liquid in vaporous form, the cells may be sufficiently warmed, or the liquid or a solid may first be vaporized. The process is useful for treating substances whose boiling points are not so high that the heat necessary to vaporize the same will cause excessive reaction between the mixed ingredients in the cell, or a reaction proportional to that caused by the light. The reaction achieved by my process may of course be readily controlled and caused to proceed to any desired extent by suitable alteration of the elements of the apparatus used, as described above.

Since the penetration of actinic rays through any gaseous mixture is inversely proportional to the concentration in such mixture of any material affected by such rays, it will be obvious that in the present simple method of causing the light to shine through an advancing column or body of vapor or gases affected by it, an automatic regulation of the amount of reaction taking place at any given point in the advance is made possible. Taking a mixture of chlorin and methane, for example, and advancing it against the travel of the light it will be obvious that at the point where the light first impinges and its actinic power is at a maximum the concentration of the chlorin and of the methane will be at a minimum while at the point of maximum concentration of these two gases the reaction-inducing power of the light will be at a minimum. At any intermediate point the concentration and intensity will be intermediate. This results in an even distribution of the reaction throughout the reaction chamber without localization of intense reaction and development of heat; and, consequently, in a smooth and even progress of reaction and smooth and even chlorination with production of definite products. This is very desirable in many arts; as in chlorinating hydrocarbons.

My process as described may be carried out continuously and in an easily regulable and flexible manner by means of the apparatus described, and this I consider a desirable form of apparatus for my invention, but it is obvious that, in its broadest sense, it is not limited to the use of the same, but may be practised, broadly, by the use of any means which permits the amount or chemical activity of light used in the process to be proportioned at each stage of the process to what is necessary and suitable at that stage. Generally speaking this means that the light effective throughout a desired reaction shall be so regulated, obscured, or screened as to gradually and progressively increase in activity from the beginning of the process to the end. Thus the invention may be carried out, with many of the advantages of the preferred method, by progressing the substances in which reaction is desired past a source of light, first through or behind a relatively opaque medium, and thence through or behind media of progressively increasing transparency, all of which are subjected to the uninterrupted action of the light. Or the process may be carried out by exposing the substances in a container to a source of light, between which and the container a series of light-screens or obscuring means are interposed, and progressively and gradually removing the same into non-obscuring position.

Having now described my invention what I claim and desire to protect by Letters Patent is as follows:—

1. The process of preparing chemical compounds, which consists in bringing together substances reaction between which is induced or accelerated by the action of light, progressing the same continuously through a conduit pervious to light so situated with respect to a source of light that the light which reaches the said substances at the beginning of their passage passes through several thicknesses of said conduit and contents, and the light which reaches said substances further along passes by a shorter path through said conduit and contents to reach said substances.

2. The process of preparing halogen compounds of hydrocarbons, which consists in mixing a halogen and a hydrocarbon in suitable proportions, and progressing the same continuously toward a source of light in a path crossing the path of light from said source a plurality of times.

3. The process of chlorinating paraffin hydrocarbons which comprises producing a mixture of chlorin and a paraffin hydrocarbon, illuminating such mixture by actinic light, and causing said mixture to flow toward the source of such light in a path crossing the path of such light a plurality of times.

4. The process of chlorinating organic compounds which comprises passing actinic light through a gaseous layer comprising chlorin in a transparent compartment, so as to modify the chemical activity of the light and thereafter irradiating with such light a mixture comprising chlorin and an organic body containing a replaceable hydrogen, in a second transparent compartment, and causing the mixture in said second compartment to travel in counter direction to the light.

This specification signed and witnessed this 23rd day of June, 1913.

WALTER O. SNELLING.

Witnesses:
C. R. KERR,
A. J. PHILLIPS.